United States Patent [19]
Bligh et al.

[11] 3,928,004
[45] Dec. 23, 1975

[54] PURIFICATION OF INERT GASES

[75] Inventors: Bernard Ramsay Bligh, Hampton Hill; John Allam, Guildford, both of England

[73] Assignee: Air Products and Chemicals, Inc., Allentown, Pa.

[22] Filed: Jan. 7, 1974

[21] Appl. No.: 431,188

[30] Foreign Application Priority Data
Jan. 8, 1973  United Kingdom................... 925/73

[52] U.S. Cl.......................................... 55/66; 55/75
[51] Int. Cl.²......................................... B01D 53/04
[58] Field of Search........................... 55/66, 75, 389

[56] References Cited
UNITED STATES PATENTS
2,810,454  10/1957  Jones et al............................ 55/66
3,085,379   4/1963  Kiyonaga et al.................. 55/62 X
3,378,992   4/1968  Pierce et al........................... 55/62

*Primary Examiner*—Thomas G. Wyse
*Assistant Examiner*—Ethel R. Cross
*Attorney, Agent, or Firm*—Richard A. Dannells, Jr.; Barry Moyerman

[57] ABSTRACT

This invention relates to a process for purifying an inert gas and particularly argon. In carrying out the process impure inert gas is passed through a bed of molecular sieve at a temperature approaching the boiling point of the inert gas so that the molecular sieve adsorbs the impurity. The bed is then regenerated by first heating and, thereafter, cooling by passing therethrough a cold stream of pure inert gas until the bed is cooled to an extent which substantially prevents argon adsorption by the molecular sieve. Finally, a stream of cold impure inert gas is reintroduced into the so regenerated bed for reiterating the step for adsorbing the impurity.

5 Claims, 1 Drawing Figure

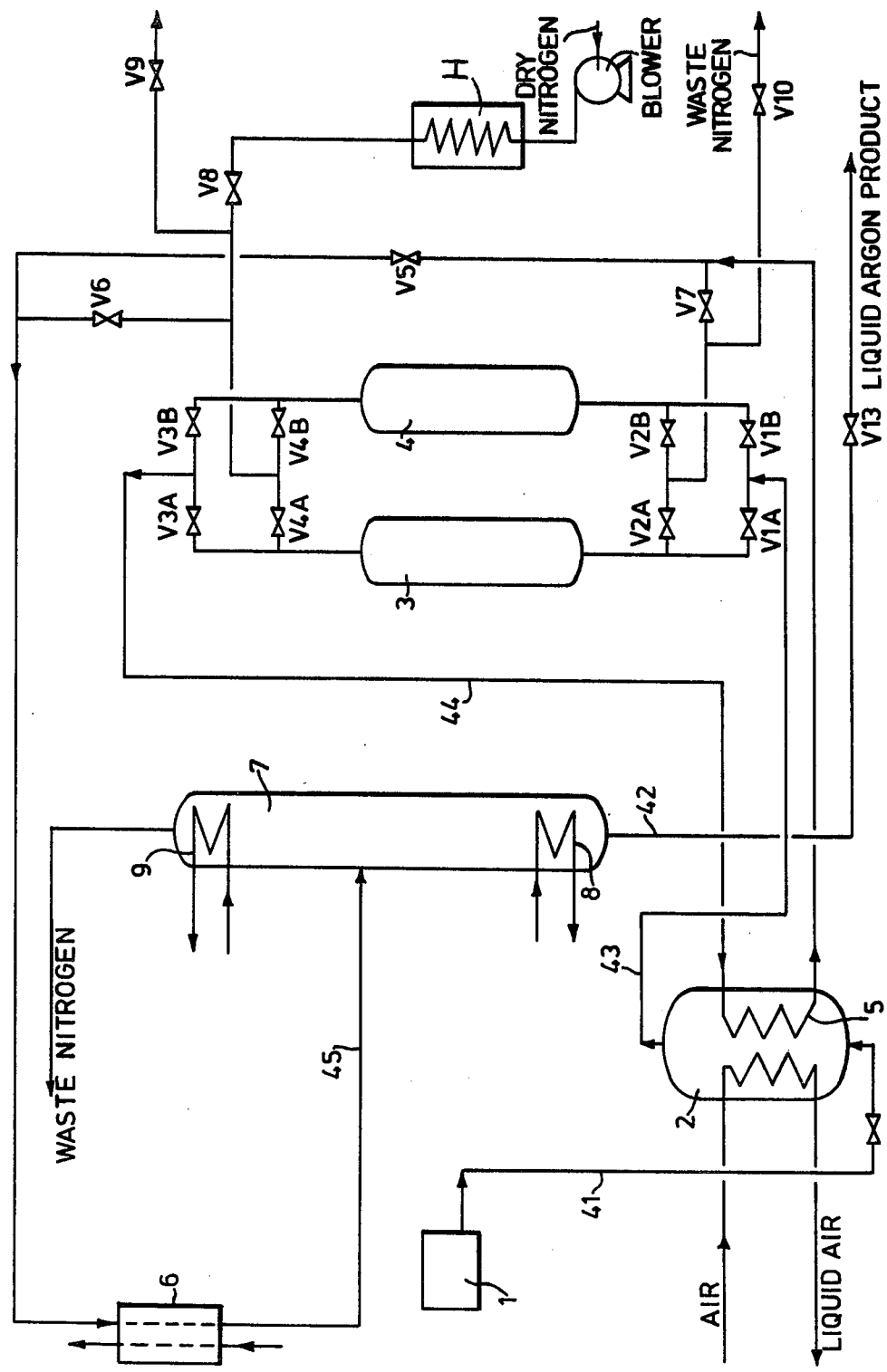

PURIFICATION OF INERT GASES

This invention relates to the purification of inert gases, and especially the purificaiton of argon.

In the prior art it has been proposed to distil air in an apparatus known as a "double column" in which a low pressure distillation column is erected above a high pressure distillation column: the reflux condenser for the high pressure column is the reboiler for the low pressure column: a stream of vapour is withdrawn from a suitable zone near the middle of the low pressure column and this vapour is subjected to rectification in another distillation column known as the "crude argon column". From the top of the crude argon column a crude argon product is withdrawn which is usually in the range 95% to 99% argon.

Up till now pure argon has been obtained from crude argon by a de-oxygenation process using pure hydrogen. The process includes the stages of compression, hydrogen addition, reaction in a catalytic deoxo reactor, drying, cooling and a cryogenic distillation to remove the last traces of hydrogen and nitrogen. This system involves a substantial amount of capitol equipment and the running cost includes the cost of the following utilities: electricity for a two-stage compressor, a reactivation blower and an electrical heater, cooling water for various after-coolers, hydrogen for the deoxo reactor, and liquid nitrogen for reflux to the distillation column.

It has been proposed that some gas mixtures may be separated by selective adsorption on zeolites: for example Barrer and Robbins suggested this in 1953 (Transactions of the Faraday Society, Volume 49, pages 807 and 815).

An example of such an operation would be to take a bed of molecular sieve pellets (a type widely known by technologists working in this field as "4A" or as NaA) and pass through it the crude argon gas; at low temperatures (e.g. $-275°F$) the molecular sieve perferentially adsorbs oxygen and a pure argon gas stream is obtained.

In order to make this operation into a practical industrial process the bed of molecular sieve must be warmed up to desorb the oxygen; the oxygen must be removed either by evacuation or by flushing with an inert gas. The desorption and removal of the impurity (e.g. oxygen) from the bed is termed "regeneration".

The regenerated bed must then be cooled to a low temperature before the crude argon gas is re-introduced to the bed.

The cooling of the regenerated bed creates a problem, because if it is cooled in the presence of pure argon, the argon becomes partially adsorbed onto the bed to such an extent that the capacity of the bed for oxygen is considerably reduced. Other workers in this field have overcome this problem in various ways. For example, Union Carbide Corporation (U.S. Pat. No. 2,810,453) propose a process in which the cooling step is done in the presence of helium.

Golovko and his associates proposed to solve the problem by cooling the bed while it is under vacuum (Bulletin of the Academy of Sciences of the Georgian SSR, Volume 44, No. 2 p. 289 to 295, and Adsorbtsionnye Khromatogr. Katal. Svoistva Tseolitov 1972, p. 177 to 183). In more detail Golovko and his associates used a bed consisting of a plurality of tubes containing molecular sieve and disposed in a bath of liquid oxygen.

On disadvantage with this proposal is that prior to regeneration of the molecular sieve, it is necessary to drain the bath of liquid oxygen.

We have found, surprisingly, that if the bed is cooled in the presence of argon, the purification process is still workable, as long as the cooling step for any individual particle is not more than about forty minutes.

Our experiments indicate that above 32°F the adsorption of argon onto molecular sieve 4A is small, and that below $-220°F$ the adsorption or argon is comparitively large, but that this equilibrium takes many hours to achieve. Hence we can inhibit the adsorption of argon onto molecular sieve 4A if these two components are cooled through the range 32°F to $-220°F$ in a comparatively short time, i.e. less than forty minutes.

According to one aspect of the present invention there is provided a process for purifying an inert gas which includes the following steps:

a. passing the impure inert gas through a bed of molecular sieve at a temperature near to the boiling point of the inert gas such that the molecular sieve adsorbs the impurity;

b. regenerating the bed of molecular sieve by heating it;

c. cooling the bed of molecular sieve by passing therethrough a cold stream of the pure inert gas, such that any individual particle of the molecular sieve passes through the temperature range 32°F to $-220°F$ in less than forty minutes; and d. re-introducing a stream of the cold impure inert gas for reiterating the purification step (a).

According to a second aspect of the present invention there is provided a process for purifying an inert gas which includes the following steps:

a. passing the impure inert gas through a bed of molecular sieve at a temperature near to the boiling point of the inert gas such that the molecular sieve adsorbs the impruity;

b. regenerating the bed of molecular sieve by heating it;

c. cooling the bed of molecular sieve by passing therethrough a cold stream of the pure inert gas so that any individual particle of the molecular sieve is cooled to an extent which substantially prevents argon adsorption by the molecular sieve; and d. re-introducing a stream of the cold impure inert gas for reiterating the purification step(a).

DESCRIPTION OF INVENTION

An embodiment of the invention will now be described by way of example and with reference to the accompanying drawing which is a flow diagram showing the operation of a purifying plant.

In the plant description which follows, the product flow rate was 3.94 1b-mole of argon per hour.

The process flowsheet shows only those items associated with the argon purification: for the sake of simplicity most of the lines and controls for the double distillation column are omitted.

Crude liquid argon leaves the first condensor 1 of the crude argon column (not shown) and enters the evaporator 2. Normally this argon contains 1% oxygen and only traces of nitrogen, but allowance is made for the possibility of breakthrough of nitrogen into the crude argon column, in which case the nitrogen content might rise as high as 3.5% corresponding to 1,000 ppm of nitrogen in the feed to the crude argon column.

The hydrostatic head of liquid in line 41, between the condenser 1 and evaporator 2 is equivalent to 45 psia and the pressure at condenser 1 is 17 psia hence the maximum possible pressure at evaporator 2 is 62 psia. In fact, the boiling conditions in evaporator 2 are −284°F and 38 psia, and therefore there is a substantial pressure drop across the flow control valve in line 41. The evaporation of argon is done against condensing air from the bottom plate of the H.P. column, not shown. It is this air condensing temperature −277°F to −281°F, which determines the boiling condition of the argon and the pressure of 38 psia is enough to drive the argon round the purification circuit to be described.

The argon enters the adsorber system through line 43. In this description molecular sieve bed 3 will be on stream to the cold argon while molecular sieve bed 4 is being regenerated.

The crude argon gas enters bed 3 through valve V1A, the oxygen being adsorbed on to the molecular sieve, while the argon passes through and leaves the bed via valve V3A into line 44, where an analyser (not shown) measures the oxygen content of the gas. The gas warms up due to the heat of adsorption; this heat is removed by passing the gas through the heat exchanger 5. The argon circuit continues via valve V5 (with valves V6 and V7 closed) to second condensor 6. The purified argon condenses at 19 psia against crude liquid oxygen.

The purified argon may contain traces of nitrogen and therefore the condensate is sent via line 45 to the nitrogen rejection column 7.

The reboiler 8, of the nitrogen rejection column operates with condensing H.P. nitrogen from the H.P. column; the reflux condenser 9, uses liquid nitrogen. The product liquid argon is analysed in line 42, and if the oxygen content rises above 7 ppm or the nitrogen above 10 ppm, the valve V13 is shut. There is a delay line between the analysis point and valve V13 which ensures that no impure argon contaminates the stored product.

While bed 3 is on stream, bed 4 is beng regenerated. Bed 4 is heated for 3 hours by nitrogen in the region of 200° to 240°F entering through valves V8 and V4B. The nitrogen need not be pure, but it must be free from water. The regenerating gas leaves bed 4 through valves V2B and V10. At the end of the 3 hour heating period the electric heater H is shut off.

The bed is now cooled by argon from heat exchanger 5. Valve V7 is partially opened to take 10% of the argon product flow through V2B and bed 4. V8 and V10 are closed. The argon purges out the nitrogen through valves V2B and V4B to the exit at V9. During this period valve V5 is kept open so that a positive feed is maintained to the column 7. Analysers monitor the gas at V9 and when the argon contains less than 0.5% nitrogen, the argon is directed to the condenser 6 via valve V6 (V5 and V9 now being closed and V7 being fully opened).

The cold argon from heat exchanger 5 continues to be sent through bed 4 in order to cool down the latter to about −279°F, i.e. as close as possible to the operational temperature. Although the cooling of the bed 4 takes about 7.5 hours with the full argon flow, the cooling cycle for any individual pellet or zone of molecular sieve in the bed is about 30 minutes or less. At the end of the completed cooling operation the beds are ready for switch over. The beds are sized for a 12 hour adsorption period at a flow rate of 3.98 1b moles per hour of crude argon containing 1% oxygen. Each bed is six feet long and one foot in diameter. The valves numbered V1A, V1B through to V10 are solenoid valves which are controlled by a timer not shown in the flowsheet.

The nitrogen rejection column 7 is installed for two reasons:

1. It is possible that traces of nitrogen from the L.P. column may breakthrough to the crude argon column, and these traces of nitrogen become concentrated in the argon by a factor of about 35 in the crude argon column.

2. The regeneration of the adsorbers leaves traces of nitrogen in the argon as explained above.

Water is detrimental to the operation of molecular sieves because it is adsorbed in preference to all permanent gases. Before bringing the beds into use and at periodic intervals thereafter it will be necessary to regenerate the beds at about 480°F (250°C) in order to remove water. It is inadvisable to exceed 480°F because of the danger of thermal attrition of the pellets, and for the same reason a comparatively long cycle is advisable to reduce the frequency of regeneration.

There are processes known to those skilled in the art wherein a gas stream rich in krypton and xenon is obtained from air separation equipment. Oxygen impurity can be eliminated from this gas stream by the presently disclosed process.

What is claimed is:

1. A process for purifying an inert gas which includes the following steps:
    a. passing the impure inert gas through a bed of molecular sieve at a temperature near to the boiling point of the inert gas, such that the molecular sieve adsorbs the impurity;
    b. regenerating the bed of molecular sieve by heating it;
    c. cooling the bed of molecular sieve by passing therethrough a cold stream of the pure inert gas at a temperature and rate such that any individual particle of the molecular sieve passes through the temperature range 32°F to −220°F in less than forty minutes; and
    d. re-introducing a stream of the cold impure inert gas for reiterating the purification step (a).

2. A process according to claim 1, wherein the cooling bed of molecular sieve is a columnar bed and the cold stream of the pure inert gas is passed therethrough so that particles of the molecular sieve in the bed are progressively and successively cooled in the direction in which the pure inert gas is passed through the bed to an extent which substantially prevents the said argon adsorption.

3. A process as claimed in claim 1 in which the gas to be purified is selected from the group consisting of argon, krypton and xenon and the impurity is oxygen.

4. A process as claimed in claim 1 wherein the gas to be purified is argon and the purification step (a) takes place at a temperature in the range −260°F to −300°F.

5. A process according to claim 1 wherein the impure inert gas is argon and the impurity is oxygen in an amount of less than 3% of the impure gas.

* * * * *